United States Patent [19]

Welter

[11] Patent Number: 5,140,910
[45] Date of Patent: Aug. 25, 1992

[54] ROLLER EQUIPPED DOLLY FOR A CAR WASH

[76] Inventor: Jeff R. Welter, 4607 N.E. 59th Ave., Vancouver, Wash. 98661

[21] Appl. No.: 801,266

[22] Filed: Dec. 2, 1991

[51] Int. Cl.⁵ .............................................. B61B 13/00
[52] U.S. Cl. .................................. 104/172.3; 104/162
[58] Field of Search .................... 104/162, 163, 172.3, 104/172.1, 172.2, 165, 172.5, 173.1; 198/732

[56] References Cited

U.S. PATENT DOCUMENTS

| | | | |
|---|---|---|---|
| 2,729,172 | 1/1956 | Grossmith | 104/172.3 |
| 3,568,606 | 3/1971 | Grant | 104/172.3 |
| 3,596,605 | 8/1971 | Shelstad | 104/172 |
| 3,693,392 | 9/1972 | Watson | 104/172 B |
| 3,724,390 | 4/1973 | Beer et al. | 104/172.3 |
| 3,815,512 | 6/1974 | Balas | 104/172 B |
| 3,971,325 | 7/1976 | Evans | 104/172.3 |
| 4,194,449 | 3/1980 | Breau | 104/172 B |
| 4,266,482 | 5/1981 | Barber | 104/172 B |
| 4,374,496 | 2/1983 | Hanna | 104/172 B |
| 4,662,284 | 5/1987 | Belanger et al. | 104/172.3 |
| 4,715,287 | 12/1987 | Wentworth et al. | 198/732 |
| 4,864,936 | 9/1989 | Rietsch, Jr. | 104/172.3 |
| 4,873,929 | 10/1989 | Witecki | 104/172.3 |
| 4,930,424 | 6/1990 | Astley | 104/172.3 |

Primary Examiner—Robert J. Oberleitner
Assistant Examiner—Mark T. Le
Attorney, Agent, or Firm—James D. Givnan, Jr.

[57] ABSTRACT

A dolly for pushing a vehicle through a car wash and including an inclined arm having a leading end located below a track of the car wash and attached to a continuous conveyor chain. A track engaging pair of rollers is carried below the track by the leading end of the arm while a trailing pair of rollers is supported by the track. An elevated pair of rollers engage an auto wheel for pushing of the auto while simultaneously contacting the track supported trailing pair of rollers. Loads imparted to the tire engaging rollers are accordingly transferred to the track with a reduction in loads imparted to roller axles. A floating mounting arrangement for the tire engaging rollers maintains roller engagement regardless of roller wear.

10 Claims, 1 Drawing Sheet

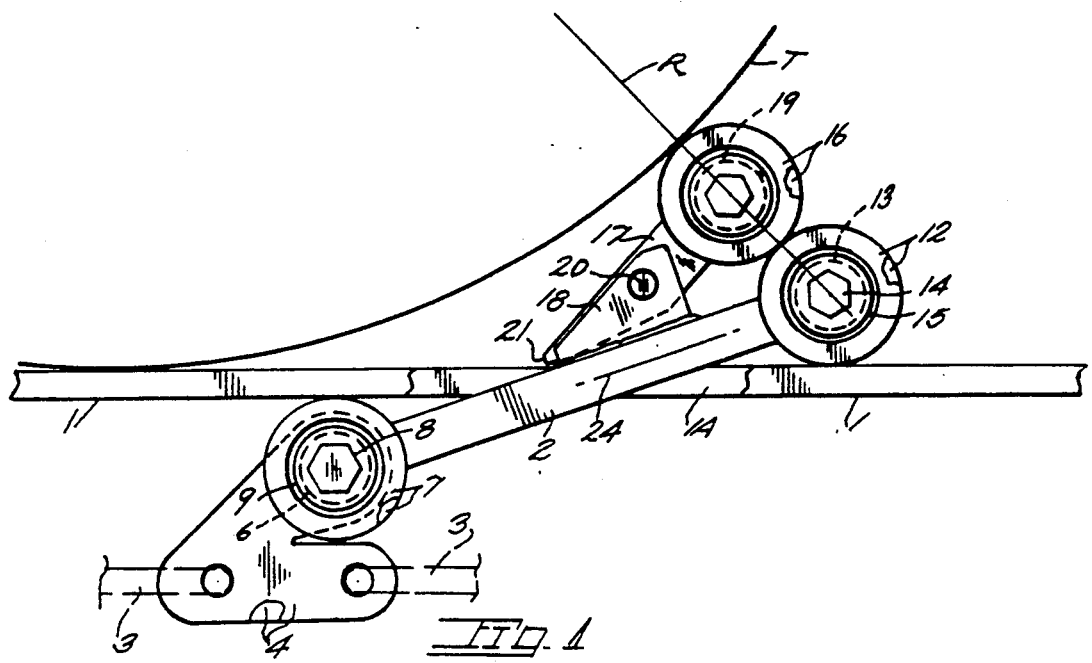
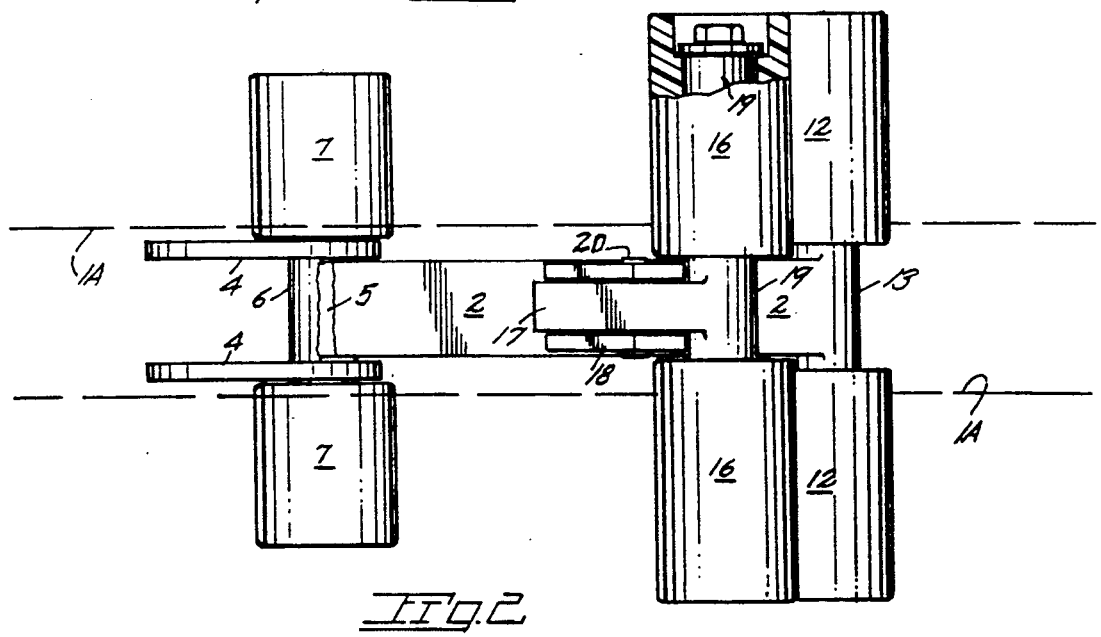

ROLLER EQUIPPED DOLLY FOR A CAR WASH

BACKGROUND OF THE INVENTION

The present invention concerns generally those roller equipped devices propelled by a continuous conveyor chain for the moving of automobiles through a car wash.

In use within the car wash industry are roller equipped devices for travel along a divided track and which engage a wheel of a vehicle being washed to propel same through the car wash. Typically such devices will include multiple rollers supporting an arm member with the trailing end of the arm member having rollers for supported engagement with the track and, in some instances, elevated rollers for contact with the tread of the vehicle tire. Substantial loads are encountered by such car propelling devices as well as a severe environment including contaminated water, dirt and harsh cleaning agents. After a period of use, wear occurs between the rollers and the axle supporting same. A problem exists when, after a substantial period of roller use, such results in an excessive clearance between the roller and axle. Such a condition results from the above mentioned factors and the severe loads borne by the roller axle. Excessive wear results in erratic rotation of the rollers during contact with the automobile tire tread. Such action of the tire contacting roller can impart sudden loads to a conveyor chain to accentuate chain wear and wear of a chain drive mechanism.

Car wash dolly construction is found in U.S. Pat. Nos. 4,873,929; 4,374,496; 4,266,482; 3,815,512; 4,194,449; 3,596,605 and 3,693,392.

SUMMARY OF THE PRESENT INVENTION

The present invention is embodied in a car propelling dolly wherein severe axle loads are avoided by providing for roller loads to be imparted directly to subjacent rollers.

The present dolly includes an arm member inclined to the direction of travel with a forward or leading end disposed subjacent a divided track of the car wash. A forward pair of rollers on the arm bear upwardly against the track underside. Connectors coupled to the forward end of the arm provide attachment to the car wash conveyor chain. A trailing end of the dolly arm is equipped with pairs of axle mounted rollers with one pair of the rollers for rolling contact with the track. Offset in the direction of dolly travel are tire engaging rollers which are in rolling, supported contact with subjacent rollers. Accordingly loads encountered by the tire engaging rollers are transferred to the track supported trailing rollers to avoid severe axle loading of the tire engaging rollers. To maintain contact between the tire engaging and track engaging rollers, the former are movably mounted so as to compensate for any alteration or change in roller size resulting in wear.

A suitable mounting arrangement for the tire engaging rollers and their axle includes a floating member which assures contact between the pairs of rollers regardless of wear occurring over a period of time. A limit stop regulates arm member movement in the opposite direction.

Important objectives of the present invention include the provision of a car pushing dolly for use in a car wash wherein roller components transfer loads to alleviate the loading of dolly axles; the provision of a car wash dolly which automatically adapts to changes in roller configuration occurring from wear over a period of time; the provision of a car wash dolly wherein the tire engaging rollers are carried in a floating manner to assure contact with subjacent rollers; the provision of a car wash dolly having a floating arm on which are carried tire engaging rollers and having a limit stop for limiting displacement of the last mentioned rollers when the dolly is inverted during movement along the return run of a conveyor chain.

BRIEF DESCRIPTION OF THE DRAWINGS

In the accompanying drawings:

FIG. 1 is a side elevational view of the present car dolly;

FIG. 2 is a plan view of FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates a track having a slotted or open area 1A along which may travel an inclined arm member 2 of the present dolly. A conveyor chain at 3 is propelled in a continuous manner and includes connector links 4 for imparting movement to the following described dolly.

The arm 2 of the present dolly is of a width so as to move in central area 1A of the track with arm member terminating forwardly below the track to thereat receive the links 4. Arm 2 terminates forwardly to receive a forward axle 6. A weld is at 5. Axle 6 carries a pair of front rollers 7 which bear upwardly against the underside of track 1 to provide support means for the forward end of arm 2 for operative travel below the track. Roller retention is by cap screws at 8 in threaded engagement with threaded bores in the axles with the cap screws bearing against washers 9 all inset within the recessed ends of the roller.

With attention now to the roller arrangement located in a trailing manner above track 1, the same includes a first or a track engaging pair of rollers 12 carried by an axle 13 which terminates at its outer ends preferably inset from the roller ends to permit retention by cap screws as at 14 and washers 15.

A second or tire engaging set of rollers at 16 on an elevated axle at 19 and are disposed for simultaneous contact during dolly operation with the periphery of subjacent lower track engaging rollers 12 and with a vehicle tire at T. Arm means at 17 supports upper rollers 16 and permits same during dolly to be in rolling engagement with track engaging rollers 12. Arm means 17 is supported between a pair of plates 18. The provision of a pivot pin at 20 permits the sets of rollers 12 and 16 to automatically compensate for wear. Preferably the major axes of axles 13 and 19 are in an inclined plane R containing the rotational axis of the automobile tire. Stated otherwise, a projected radius of tire T would lie in plane R and intersect the major axes of axles 13 and 19. As various sizes of tires are encountered in a car wash installation such a relationship will not always be the case and hence the angular relationship of rollers 16 and 12 will be such as to best accommodate a range of common tire diameters. One suitable angular relationship between the sets of rollers 12 and 16 is achieved by locating the major axes of axles 13 and 19 in inclined plane R which defines an included angle of approximately 65 degrees with a medial plane 24 of arm 2.

A limit stop 21 on yieldable arm 17 restricts downward movement of same when the dolly is inverted during travel along the lower or return run of chain 3. Accordingly, the tire engaging rollers 16 are prevented from excessive gravitational displacement away from arm 2 to preclude undesired rollers contact with equipment located near the conveyor chain path.

In certain instances it may be desirable to fixedly attach arm means 17 to arm 2.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A dolly for attachment to an endless conveyor for moving a car along a divided track of a car wash installation, said dolly comprising, an arm having a leading end and a trailing end, means for coupling the leading end of the arm to the endless conveyor, support means at the leading end of said arm for traveling engagement with said track, a first axle and a first set of rollers journalled thereon for travel along said track, said first axle mounted adjacent the trailing end of said arm, a second axle carried by said arm and a second set of rollers journalled thereon, said second set of rollers for contact with a car tire, and said second set of rollers in contact with said first set of rollers during dolly operation whereby tire imparted loads on said second set of rollers are transferred to said first set of rollers and thence to the track to diminish axle loading by the rollers and roller wear.

2. The dolly claimed in claim 1 additionally including means movably coupling said second axle and second set of rollers to said arm for downward movement of said second axle and second set of rollers toward said first axle and said first set of rollers for roller contact to compensate for roller wear.

3. The dolly claimed in claim 2 wherein said means movably coupling said second axle and second set of rollers to said arm includes a floating arm permitting automatic wear compensation for roller wear by advancement of said second axle toward said first axle.

4. The dolly claimed in claim 3 wherein said floating arm may move into contact with said arm to limit travel of the floating arm when the dolly is inverted by the conveyor.

5. A dolly for pushing an auto through a car wash along a divided track of a car wash installation, said dolly comprising, an arm having a leading end adapted for coupling to an endless powered conveyor of the car wash installation, track engaging means carried by said leading end of the arm, said arm having a trailing end, track engaging rollers and an axle therefor carried adjacent the trailing end of said arm, tire engaging rollers and an axle therefor carried by said arm with the rotational axis of said tire engaging rollers located in a first horizontal plane above a second horizontal plane containing the rotational axis of said track engaging rollers and said tire engaging rollers in rolling engagement with said track engaging rollers during pushing of an auto to transfer loads imparted by the tire to the track engaging rollers.

6. The dolly claimed in claim 5 additionally including yieldable means coupling said tire engaging rollers and the axle therefor to said arm to maintain surface contact of the tire engaging rollers with said track engaging rollers regardless of wear of the rollers.

7. The dolly claimed in claim 6 wherein said yieldable means includes a pivot arm.

8. The dolly claimed in claim 7 wherein said pivot arm is adapted for limited movement to retain the pivot arm adjacent said arm when the dolly is inverted by the conveyor.

9. The dolly claimed in claim 5 wherein the rotational axis of said tire engaging rollers and the rotational axis of said track engaging rollers are intersected by a projected tire radius.

10. A dolly for propelling a vehicle through a car wash installation including a continuous conveyor located below a track, said dolly comprising, an arm having a leading end and trailing end, coupling means for attaching the leading end of the arm to the conveyor, means for movably supporting the leading end of the arm on said track, upper and lower rollers for respective engagement with the vehicle and track and carried by the arm and disposed adjacent the trailing end of the arm, said upper and lower rollers in surface contact with one another whereby loads imparted to the upper rollers by the vehicle are transferred to the lower rollers and thence to the track.

* * * * *